United States Patent
Mizukami (10) Patent No.: US 12,451,782 B2
(45) Date of Patent: Oct. 21, 2025

(54) MOTOR AND AIRCRAFT

(71) Applicant: NIDEC CORPORATION, Kyoto (JP)

(72) Inventor: Junya Mizukami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 287 days.

(21) Appl. No.: 17/893,176

(22) Filed: Aug. 23, 2022

(65) Prior Publication Data

US 2023/0064660 A1  Mar. 2, 2023

(30) Foreign Application Priority Data

Aug. 31, 2021 (JP) ................. 2021-141826

(51) Int. Cl.

| | |
|---|---|
| H02K 9/02 | (2006.01) |
| B64U 50/19 | (2023.01) |
| H02K 1/16 | (2006.01) |
| H02K 1/24 | (2006.01) |
| H02K 1/2786 | (2022.01) |
| H02K 5/20 | (2006.01) |
| H02K 21/22 | (2006.01) |
| B64U 10/13 | (2023.01) |

(52) U.S. Cl.
CPC ........... *H02K 21/222* (2013.01); *B64U 50/19* (2023.01); *H02K 1/16* (2013.01); *H02K 1/24* (2013.01); *H02K 1/2786* (2013.01); *H02K 5/207* (2021.01); *H02K 9/02* (2013.01); *B64U 10/13* (2023.01)

(58) Field of Classification Search
CPC ......... H02K 9/02; H02K 1/2786; H02K 5/207
See application file for complete search history.

(56) References Cited

U.S. PATENT DOCUMENTS

| | | | |
|---|---|---|---|
| 7,589,442 | B2 | 9/2009 | Kim et al. |
| 2008/0193275 | A1* | 8/2008 | De Filippis ............. H02K 1/30 |
| | | | 310/43 |
| 2020/0169132 | A1* | 5/2020 | Kim ...................... H02K 1/2766 |
| 2020/0321830 | A1* | 10/2020 | Oketani ................. H02K 1/276 |
| 2021/0167658 | A1 | 6/2021 | Hanaoka |
| 2023/0299625 | A1* | 9/2023 | Tsuchiya ............... H02K 5/203 |
| | | | 310/156.01 |

FOREIGN PATENT DOCUMENTS

| | | |
|---|---|---|
| CN | 205602145 U | 9/2016 |
| JP | 2008-154369 A | 7/2008 |

\* cited by examiner

*Primary Examiner* — Sean Kayes
(74) *Attorney, Agent, or Firm* — HAUPTMAN HAM, LLP (57) ABSTRACT

A motor includes a rotor and a stator. The rotor can rotate about a central axis extending in an axial direction. The stator includes a stator core having an annular shape surrounding the central axis. The rotor includes a cylindrical portion, a first plate portion, a second plate portion, and a hole. The cylindrical portion is arranged on a radially outer side with respect to the stator and extends in the axial direction. The first plate portion is arranged on a first axial side with respect to the stator, and expands radially inward from a first axial end of the cylindrical portion. The second plate portion is arranged on a second axial side with respect to the stator, and expands radially inward from a second axial end of the cylindrical portion. The hole penetrates at least one of the cylindrical portion, the first plate portion, and the second plate portion.

9 Claims, 9 Drawing Sheets

MOTOR AND AIRCRAFT

CROSS-REFERENCE TO RELATED APPLICATIONS

The present invention claims priority under 35 U.S.C. § 119 to Japanese Patent Application No. 2021-141826 filed on Aug. 31, 2021, the entire content of which is incorporated herein by reference.

FIELD OF THE INVENTION

The present invention relates to a motor and an aircraft.

BACKGROUND

Conventionally, there is known a technique for dissipating heat from a motor by disposing a hole in a lid body of a rotating body. For example, a rotor is rotatably connected on a base to which a stator is fixed. Since the hole is provided in the lid body installed on the rotor, the flow of air inside the motor is promoted.

In the conventional motor, however, the base does not rotate, and thus, there is a possibility that the air does not sufficiently flow on a fixed portion side of the stator. Therefore, there is a possibility that it is difficult to sufficiently dissipate the heat inside the motor.

SUMMARY

An exemplary motor of the present invention includes a rotor and a stator. The rotor can rotate about a central axis extending in an axial direction. The stator includes a stator core having an annular shape surrounding the central axis. The rotor includes a cylindrical portion, a first plate portion, a second plate portion, and a hole. The cylindrical portion is arranged on a radially outer side with respect to the stator and extends in the axial direction. The first plate portion is arranged on a first axial side with respect to the stator, and expands radially inward from a first axial end of the cylindrical portion. The second plate portion is arranged on a second axial side with respect to the stator, and expands radially inward from a second axial end of the cylindrical portion. The hole penetrates at least one of the cylindrical portion, the first plate portion, and the second plate portion.

An exemplary aircraft of the present invention includes a motor as described above.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments will be described with reference to the drawings.

In the present specification, in a motor 100, a direction parallel to a central axis CX is referred to by the term "axial direction", "axial", or "axially". A direction orthogonal to a predetermined axis, such as the central axis CX, is referred to as a "radial direction", "radial", or "radially", and a rotational direction about the predetermined axis is referred to as a "circumferential direction", "circumferential", or "circumferentially". Of the radial directions, a direction approaching the predetermined axis is referred to as a "radially inner side", and a direction separating from the predetermined axis is referred to as a "radially outer side".

In this specification, an "annular shape" includes not only a shape continuously connected without any cut along the entire circumference in the circumferential direction around the central axis CX but also a shape having one or more cuts in a part of the entire circumference around the central axis CX. The "annular shape" also includes a shape having a closed curve on a curved surface that intersects with the central axis CX around the central axis CX.

In a positional relationship between any one element and another element of an orientation, a line, and a surface, the term "parallel" includes not only a state in which these elements endlessly extend without intersecting at all but also a state in which these elements are substantially parallel. Further, "perpendicular" and "orthogonal" include not only a state in which both of them intersect each other at 90 degrees, but also a state in which they are substantially perpendicular and a state in which they are substantially orthogonal. In other words, each of "parallel", "perpendicular", and "orthogonal" includes a state in which the positional relationship between the two of them permits an angular deviation to a degree not departing from the spirit of the present invention.

Note that these terms are names used merely for description, and are not intended to limit actual positional relationships, directions, names, and the like.

Figure 1:
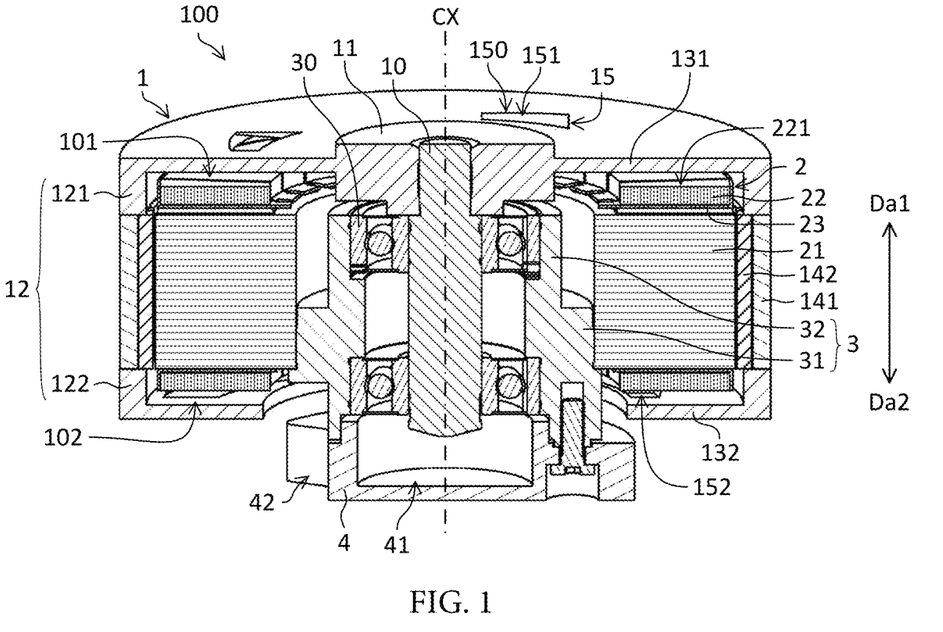
FIG. 1 is a sectional view illustrating a configuration example of a motor according to a first embodiment.
Figure 2:
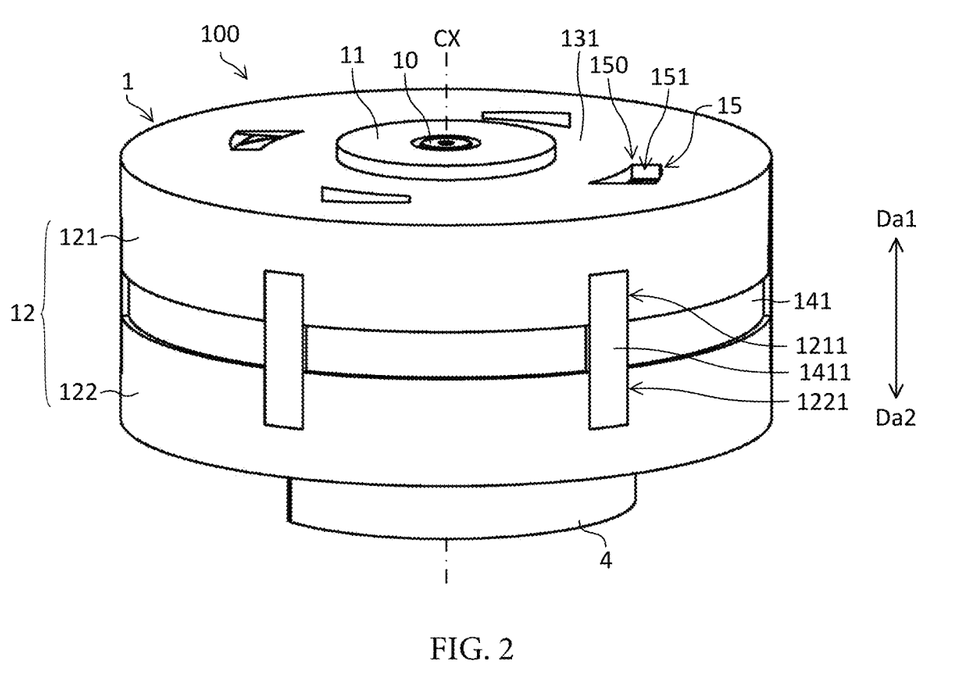
FIG. 2 is a perspective view illustrating an appearance of the motor according to the first embodiment.
Figure 3:
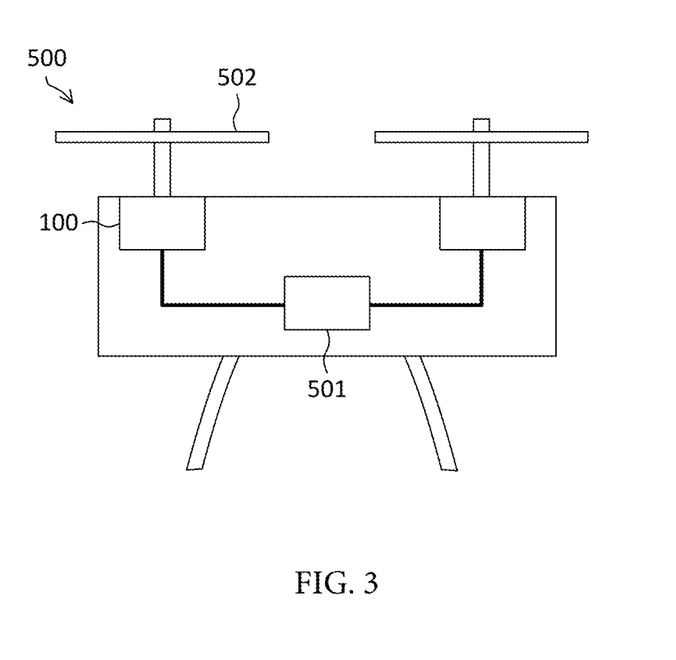
FIG. 3 is a view illustrating an example of an aircraft on which the motor is mounted.

FIG. 1 is a sectional view illustrating a configuration example of the motor 100 according to a first embodiment. FIG. 2 is a perspective view illustrating an appearance of the motor 100 according to the first embodiment. FIG. 3 is a view illustrating an example of an aircraft 500 on which the motor 100 is mounted. Note that FIG. 2 shows the cross-sectional structure of the motor 100 in the case of being cut along a virtual plane including the central axis CX.

As illustrated in FIG. 3, the aircraft 500 includes the motor 100. The aircraft 500 further includes a battery 501 and a propeller 502. The motor 100 is a drive source for the aircraft 500 such as a drone. For example, the motor 100 receives power supply from the battery 501 and drives the propeller 502 to rotate. In the aircraft 500 of FIG. 3, heat dissipation performance of the motor 100 can be improved as described later. Note that the application of the motor 100 is not limited to the example of FIG. 3.

As illustrated in FIGS. 1 and 2, the motor 100 includes a rotor 1, a stator 2, a stator holder 3, and a base portion 4.

The rotor 1 is rotatable about the central axis CX extending in the axial direction. As described above, the motor 100 has the rotor 1. The rotor 1 includes a shaft 10 having a columnar shape, a rotor hub 11, a cylindrical portion 12, a first plate portion 131, a second plate portion 132, a rotor core 141, a magnet 142, holes 15, a first groove 161, and a second groove 162. Hereinafter, the first plate portion 131 and the second plate portion 132 may be collectively referred to as a "plate portion 13".

The shaft 10 extends along the central axis CX along the axial direction.

The rotor hub 11 has an annular shape surrounding the central axis CX, and is fixed to a radially outer surface of the shaft 10.

The cylindrical portion 12 is arranged on the radially outer side of the stator 2 and extends in the axial direction. As described above, the rotor 1 has the cylindrical portion 12. The cylindrical portion 12 has a first cylindrical portion 121 and a second cylindrical portion 122. The first cylindrical portion 121 and the second cylindrical portion 122 have a cylindrical shape surrounding the central axis CX and extend in the axial direction.

The first cylindrical portion 121 has a plurality of recesses 1211 arranged side by side in the circumferential direction. Each of the recesses 1211 is recessed from an end of the first cylindrical portion 121 on the second axial side Da2 toward a first axial side Da1, and penetrates the first cylindrical portion 121 in the radial direction.

The second cylindrical portion 122 is arranged on the second axial side Da2 with respect to the first cylindrical portion 121, and is arranged side by side with the first cylindrical portion 121 in the axial direction with a gap in the present embodiment. The second cylindrical portion 122 has a plurality of recesses 1221 arranged side by side in the circumferential direction. Each of the recesses 1221 is recessed from an end of the second cylindrical portion 122 on the first axial side Da1 toward the second axial side Da2, and penetrates the second cylindrical portion 122 in the radial direction.

The first plate portion 131 is arranged on the first axial side Da1 with respect to the stator 2 and expands radially inward from the end of the cylindrical portion 12 on the first axial side Da1. As described above, the rotor 1 has the first plate portion 131. The first plate portion 131 faces the stator 2 in the axial direction. The first plate portion 131 has a radially outer end connected to the first cylindrical portion 121. The first plate portion 131 has a radially inner end connected to a radially outer end of the rotor hub 11.

The second plate portion 132 is arranged on the second axial side Da2 with respect to the stator 2 and expands radially inward from the end of the cylindrical portion 12 on the second axial side Da2. As described above, the rotor 1 has the second plate portion 132. The second plate portion 132 faces the stator 2 in the axial direction. The second plate portion 132 has a radially outer end connected to the second cylindrical portion 122. The second plate portion 132 has a radially inner end facing the stator holder 3 in the radial direction with a gap.

Since the rotor 1 has both the first plate portion 131 and the second plate portion 132, air in a first space 101 can be circulated by the rotation of the first plate portion 131 when the rotor 1 rotates. Further, air in a second space 102 can be circulated by the rotation of the second plate portion 132. Note that the first space 101 is a space between the first plate portion 131 and an end of the stator 2 on the first axial side Da1. The second space 102 is a space between the second plate portion 132 and an end of on the second axial side Da2 of the stator 2. Therefore, it is possible to promote heat dissipation at both the axial ends of the stator 2 and suppress a temperature rise of the stator 2. Thus, the heat dissipation performance of the motor 100 can be improved.

The rotor core 141 has a cylindrical shape surrounding the central axis CX, and is arranged on a radially inner surface of the cylindrical portion 12. The rotor core 141 is a magnetic body, and is, for example, a laminated body of electromagnetic steel plates laminated in the axial direction in the present embodiment. The rotor core 141 has an end on the first axial side Da1 connected to a radially inner surface of the first cylindrical portion 121. The rotor core 141 has an end on the second axial side Da2 connected to a radially inner surface of the second cylindrical portion 122. The first cylindrical portion 121 is connected to the second cylindrical portion 122 with a gap in the axial direction through the rotor core 141. The volume of the cylindrical portion 12 can be reduced, which contributes to reduction in weight of the motor 100 (particularly, the rotor 1).

The rotor core 141 has a plurality of protrusions 1411 arranged side by side in the circumferential direction. The protrusion 1411 protrudes radially outward and extends in the axial direction on a radially outer surface of the rotor core 141. The protrusion 1411 has an end on the first axial side Da1 fitting into the recess 1211 of the first cylindrical portion 121. The protrusion 1411 has an end on the second axial side Da2 fitting into the recess 1221 of the second cylindrical portion 122. With these fitting structures, it is possible to reliably prevent the rotor core 141 and the magnet 142 from rotating in the circumferential direction with respect to the cylindrical portion 12. Furthermore, when the rotor 1 is assembled, a circumferential position of a part of the rotor 1 on the second axial side Da2 including the second cylindrical portion 122 and the second plate portion 132 can be easily determined with respect to a part of the rotor 1 on the first axial side Da1 including the first cylindrical portion 121 and the first plate portion 131.

The magnet 142 is arranged on a radially inner surface of the rotor core 141 and faces the stator 2 in the radial direction. In the magnet 142, magnetic poles different from each other (that is, an N pole and an S pole) are alternately arranged in the circumferential direction. The magnet 142 may be an annular member surrounding the central axis CX, or may be configured by a plurality of magnetic pole pieces arranged in the circumferential direction.

The hole 15 penetrates at least one of the cylindrical portion 12, the first plate portion 131, and the second plate portion 132. The rotor 1 has the hole 15 as described above. Since the rotor 1 has the hole 15, the hole 15 functions as an intake port or an exhaust port when the rotor 1 rotates, and an air flow can be generated between the rotor 1 and the stator 2. Therefore, the heat dissipation performance of the stator 2, particularly a coil portion 22, can be improved. Thus, the heat dissipation performance of the motor 100 can be improved.

Preferably, the holes 15 include at least one rotor hole 150 of a first rotor hole 151 and a second rotor hole 152. The first rotor hole 151 penetrates the first plate portion 131 in the axial direction. The second rotor hole 152 penetrates the second plate portion 132 in the axial direction. In the present embodiment, the holes 15 include the first rotor hole 151 and the second rotor hole 152.

Since the first rotor hole 151 is arranged in the first plate portion 131, air can flow into the first space 101 between the first plate portion 131 and the end of the stator 2 on the first axial side Da1 from the outside of the rotor 1 when the rotor 1 rotates. Alternatively, the air circulating in the first space 101 can be discharged to the outside of the rotor 1. Therefore, the end of the stator 2 on the first axial side Da1, particularly a coil head 221 on the first axial side Da1 can dissipate heat, and the temperature rise of the stator 2 can be suppressed. Note that the coil head 221 is a part of the coil portion 22 of the stator 2 on the axially outer side with respect to the stator core 21, and includes, for example, a part of the coil portion 22 on the first axial side Da1 with respect to the stator core 21 and a part on the second axial side Da2.

Further, since the second rotor hole 152 is arranged in the second plate portion 132, air can flow into the second space 102 between the second plate portion 132 and an end of the stator 2 on the second axial side Da2 from the outside of the rotor 1 when the rotor 1 rotates. Alternatively, the air circulating in the second space 102 can be discharged to the outside of the rotor 1. Therefore, the end of the stator 2 on the second axial side Da2, particularly, the coil head 221 on the second axial side Da2 can dissipate heat, and the temperature rise of the stator 2 can be suppressed.

More preferably, the holes 15 include both the first rotor hole 151 and the second rotor hole 152 as illustrated in FIG. 1. As a result, one of the both can function as the intake port and the other can function as the exhaust port. These functions change depending on the rotational direction of the rotor 1. For example, when the rotor 1 rotates in the circumferential direction, the first rotor hole 151 serves as the intake port and the second rotor hole 152 serves as the exhaust port. On the other hand, when the rotor 1 rotates in the opposite circumferential direction, the first rotor hole 151 serves as the exhaust port and the second rotor hole 152 serves as the intake port. Therefore, the motor 100 can reliably perform both the air intake and exhaust with respect to the outside of the rotor 1 regardless of the rotational direction of the rotor 1, and the ventilation efficiency between the rotor 1 and the stator 2 can be improved.

Preferably, at least one of the rotor holes 150 overlaps the coil portion 22 as viewed from the axial direction. For example, in FIG. 1, at least a part of the first rotor hole 151 overlaps the coil head 221 on the first axial side Da1 of the coil portion 22 as viewed from the axial direction. Further, at least a part of the second rotor hole 152 overlaps the coil head 221 on the second axial side Da2 of the coil portion 22 as viewed from the axial direction. Thus, the motor 100 can bring the air flowing in from the outside of the rotor 1 into direct contact with the coil portion 22. Further, the motor 100 can efficiently discharge the air in the vicinity of the coil portion 22 to the outside of the rotor 1. Therefore, the heat dissipation efficiency of the coil portion 22 can be improved. However, this example does not exclude a configuration in which the first rotor hole 151 and the second rotor hole 152 do not overlap the coil portion 22 as viewed from the axial direction.

Figure 4A:
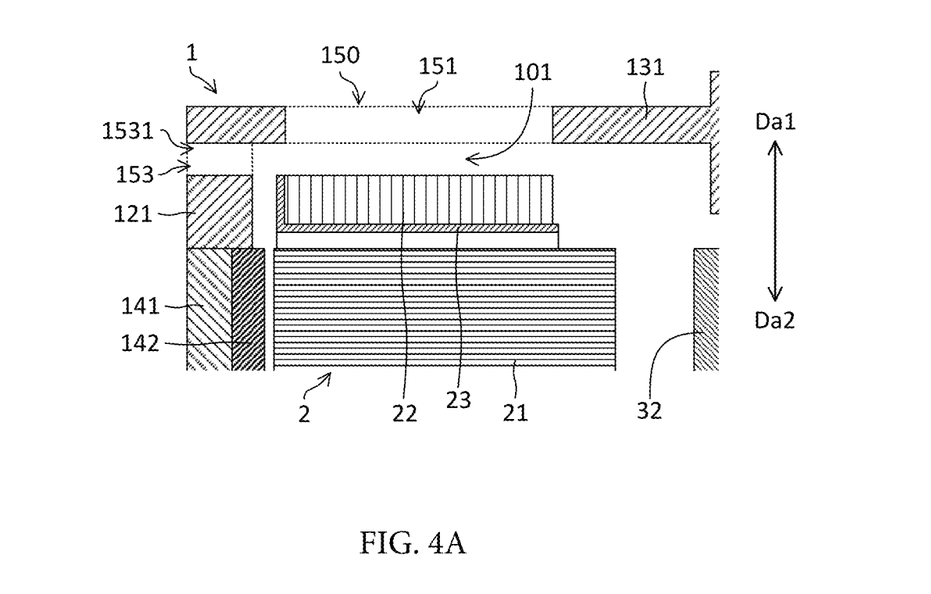
FIG. 4A is a sectional view illustrating an arrangement example of a hole on a first axial side of a rotor.
Figure 4B:
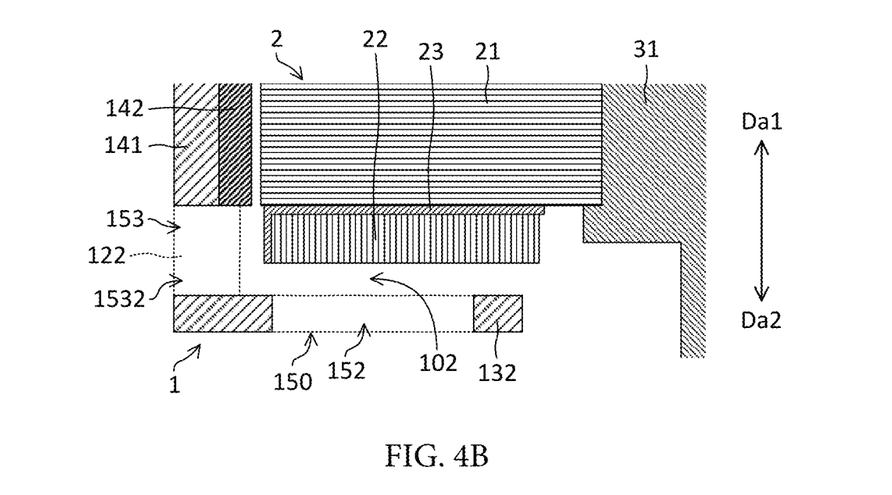
FIG. 4B is a sectional view illustrating an arrangement example of the hole on a second axial side of the rotor.

Note that the hole 15 is not arranged in the cylindrical portion 12 in FIGS. 1 and 2. However, the present invention is not limited to the examples of FIGS. 1 and 2, and the hole 15 may be arranged in the cylindrical portion 12. FIG. 4A is a sectional view illustrating an arrangement example of the hole 15 on the first axial side Da1 of the rotor 1. FIG. 4B is a sectional view illustrating an arrangement example of the hole 15 on the second axial side Da2 of the rotor 1. For example, as illustrated in FIGS. 4A and 4B, the holes 15 may further include a side hole 153 penetrating the cylindrical portion 12 in the radial direction. In other words, the rotor 1 may have the side hole 153 penetrating the cylindrical portion 12 in the radial direction. In FIG. 4A, the side hole 153 includes a first side hole 1531 penetrating the first cylindrical portion 121 in the radial direction. In FIG. 4B, the side hole 153 includes a second side hole 1532 penetrating the second cylindrical portion 122 in the radial direction. The side hole 153 may include both the first side hole 1531 and the second side hole 1532, or may include only one of the first side hole 1531 and the second side hole 1532. At this time, preferably, at least one of the rotor holes 150 is arranged on the radially inner side of the cylindrical portion 12.

Thus, the motor 100 can take in air from the outside of the rotor 1 in through first rotor hole 151 and/or the second rotor hole 152 by the rotation of the rotor 1, and can efficiently discharge the air dissipated from the stator 2 through the side hole 153. Since the air smoothly flows from the first rotor hole 151 and/or the second rotor hole 152 to the side hole 153, the motor 100 can efficiently perform ventilation between the rotor 1 and the stator 2. Furthermore, it is possible to prevent water or dust from entering the inside of the rotor 1 through the side hole 153 due to air exhaust from the side hole 153. However, the examples of FIGS. 4A and 4B do not exclude a configuration in which at least one of the rotor holes 150 is not arranged on the radially inner side of the cylindrical portion 12 when the hole 15 includes the side hole 153.

Preferably, at least a part of the side hole 153 is arranged closer to at least one of the rotor holes 150 than the stator 2 in the axial direction. Thus, the motor 100 can more efficiently perform the ventilation between the rotor 1 and the stator 2.

For example, when the first rotor hole 151 is arranged in the first plate portion 131, preferably, at least a part of the first side hole 1531 is arranged in a part of the first cylindrical portion 121 on the first axial side Da1 with respect to the stator 2 as illustrated in FIG. 4A. More preferably, the entire first side hole 1531 is arranged in the part of the first cylindrical portion 121 on the first axial side Da1 with respect to the stator 2. As a result, air can smoothly flow from the first rotor hole 151 toward the first side hole 1531.

Further, when the second rotor hole 152 is arranged in the second plate portion 132, preferably, at least a part of the second side hole 1532 is arranged in a part of the second cylindrical portion 122 on the second axial side Da2 with respect to the stator 2 as illustrated in FIG. 4B. More preferably, the entire second side hole 1532 is arranged in the part of the second cylindrical portion 122 on the second axial side Da2 with respect to the stator 2. As a result, air can smoothly flow from the second rotor hole 152 toward the second side hole 1532.

Note that the examples of FIGS. 1 to 4B do not exclude a configuration in which the hole 15 does not include the rotor hole 150 and a configuration in which the hole 15 does not include the side hole 153. That is, it is sufficient for the hole 15 to include at least one of the first rotor hole 151, the second rotor hole 152, and the side hole 153.

Figure 5A:
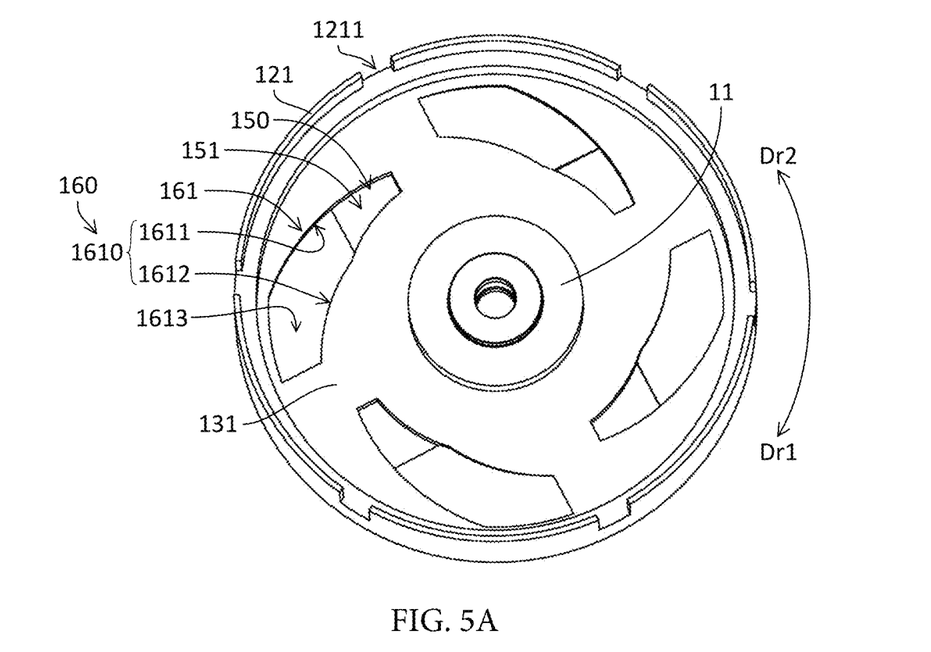
FIG. 5A is a perspective view illustrating a configuration example of a first groove.
Figure 5B:
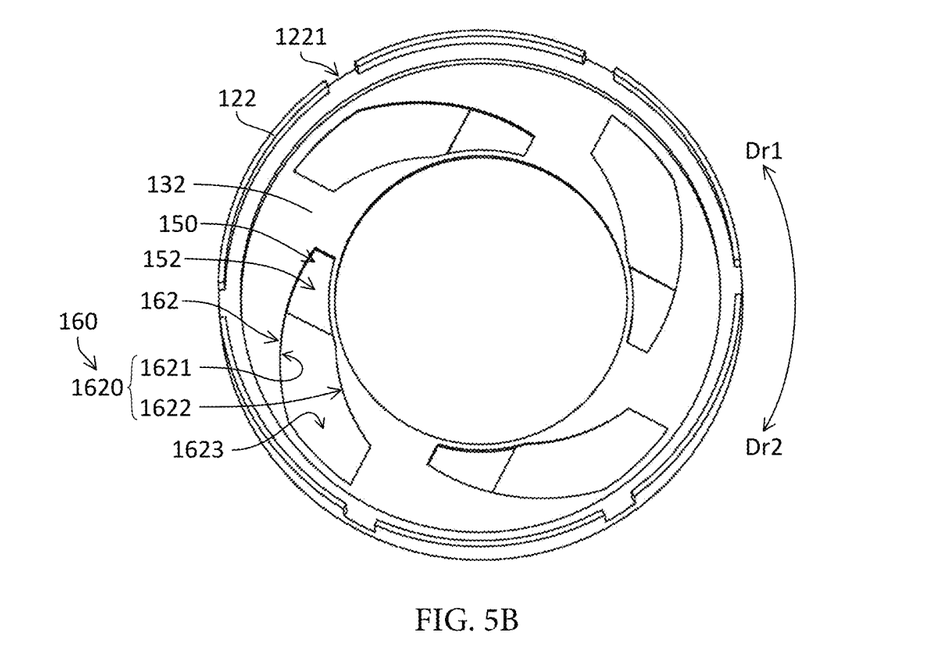
FIG. 5B is a perspective view illustrating a configuration example of a second groove.

Next, the first groove 161 and the second groove 162 will be described with reference to FIGS. 5A and 5B. FIG. 5A is a perspective view illustrating a configuration example of the first groove 161. FIG. 5B is a perspective view illustrating a configuration example of the second groove 162. In FIG. 5A, the first cylindrical portion 121 and the first plate portion 131 are viewed from the second axial side Da2 toward the first axial side Da1. On the other hand, in FIG. 5B, the second cylindrical portion 122 and the second plate portion 132 are viewed from the first axial side Da1 toward the second axial side Da2. Therefore, the first axial side Da1, the second axial side Da2, a first circumferential side Dr1, and a second circumferential side Dr2 in FIG. 5B are opposite to those in FIG. 5A.

The rotor 1 includes a plurality of the first grooves 161 arranged side by side in the circumferential direction and a plurality of the second grooves 162 arranged side by side in the circumferential direction. However, the present invention is not limited to this example, and at least one of the number of the first grooves 161 and the number of the second grooves 162 may be one. The first groove 161 is arranged on an end surface of the first plate portion 131 on the second axial side Da2 and is recessed to the first axial side Da1. The first groove 161 extends at least radially inward and is connected to the first rotor hole 151. The second groove 162 is arranged on an end surface of the second plate portion 132 on the first axial side Da1 and is recessed toward the second axial side Da2. The second groove 162 extends at least radially inward and is connected to the second rotor hole 152.

In the present embodiment, the first groove 161 and the second groove 162 extend spirally from the radially outer side toward the radially inner side. Further, the first groove 161 and the second groove 162 have spiral shapes that spiral in opposite directions to each other. For example, as illustrated in FIG. 5A, the first groove 161 further extends toward the first circumferential side Dr1, and extends radially inward as proceeding toward the first circumferential side Dr1. An end of the first groove 161 on the radially inner side and on the first circumferential side Dr1 is connected to the first rotor groove 171. As illustrated in FIG. 5B, the second groove 162 further extends toward the second circumferential side Dr2, and extends radially inward as proceeding toward the second circumferential side Dr2. An end of the second groove 162 on the radially inner side and on the second circumferential side Dr2 is connected to the second rotor groove 172. However, the present invention is not limited to the examples of FIGS. 5A and 5B, and the first groove 161 and the second groove 162 may have spiral shapes that spiral in the same direction. Further, at least one of the first groove 161 and the second groove 162 does not necessarily have the spiral shape as described above, and may radially extend from the radially outer side toward the rotor hole 150 on the radially inner side, for example.

The first groove 161 has a first wall surface 1610 facing the circumferential direction. The first wall surface 1610 is arranged at an end of the first plate portion 131 on the second axial side Da2 and extends at least in the radial direction. The first wall surface 1610 is connected to the first rotor hole 151 and is more inclined to the first circumferential side Dr1 as proceeding radially inward.

The first wall surface 1610 has an outer wall surface 1611 and an inner wall surface 1612. The outer wall surface 1611 and the inner wall surface 1612 face each other in the circumferential direction, and further face each other in the radial direction in the present embodiment. The outer wall surface 1611 and the inner wall surface 1612 extend at least in the axial direction and the radial direction. The outer wall surface 1611 faces at least the second circumferential side Dr2, and further faces the radially inner side in the present embodiment. The inner wall surface 1612 is arranged on the second circumferential side Dr2 with respect to the outer wall surface 1611, and is further arranged on the radially inner side with respect to the outer wall surface 1611 in the present embodiment. The inner wall surface 1612 faces at least the first circumferential side Dr1, and further faces the radially outer side in the present embodiment.

Further, the first groove 161 further includes a bottom surface 1613 facing the second axial side Dat. The bottom surface 1613 is arranged between the outer wall surface 1611 and the inner wall surface 1612 and extends at least in the radial direction as viewed in the axial direction.

In the present embodiment, the outer wall surface 1611, the inner wall surface 1612, and the bottom surface 1613 further extend in the circumferential direction, and extend toward the first circumferential side Dr1 as proceeding radially inward. An end of the outer wall surface 1611 on the radially inner side and on the first circumferential side Dr1 is connected to a radially outer end of the first rotor hole 151. An end of the inner wall surface 1612 on the radially inner side and on the first circumferential side Dr1 is connected to a radially inner end of the first rotor hole 151. An end of the bottom surface 1613 on the radially inner side and on the first circumferential side Dr1 is connected to an end of the first rotor hole 151 on the second circumferential side Dr2.

Preferably, the bottom surface 1613 extends toward the first axial side Da1 as proceeding from an end on the second circumferential side Dr2 toward the first rotor hole 151. More preferably, an end of the bottom surface 1613 on the first circumferential side Dr1 and on the radially inner side is connected to an end of the first rotor hole 151 on the first axial side Da1. Thus, air flowing in from the first rotor hole 151 can smoothly flow along the bottom surface 1613. Alternatively, air flowing in the vicinity of the bottom surface 1613 smoothly flows toward the first rotor hole 151 due to the bottom surface 1613 and can flow out through the first rotor hole 151. Therefore, it is possible to suppress the occurrence of turbulence in the first rotor hole 151 and the first groove 161.

The second groove 162 has a second wall surface 1620 facing the circumferential direction. The second wall surface 1620 is arranged at an end of the second plate portion 132 on the first axial side Da1 and extends at least in the radial direction. The second wall surface 1620 is connected to the second rotor hole 152 and is more inclined to the second circumferential side Dr2 as proceeding radially inward.

The second wall surface 1620 has an outer wall surface 1621 and an inner wall surface 1622. The outer wall surface 1621 and the inner wall surface 1622 face each other in the circumferential direction, and further face each other in the radial direction in the present embodiment. The outer wall surface 1621 and the inner wall surface 1622 extend at least in the axial direction and the radial direction. The outer wall surface 1621 faces at least the first circumferential side Dr1, and further faces the radially inner side in the present embodiment. The inner wall surface 1622 is arranged on the first circumferential side Dr1 with respect to the outer wall surface 1621, and is further arranged on the radially inner side with respect to the outer wall surface 1621 in the present embodiment. The inner wall surface 1622 faces at least the second circumferential side Dr2, and further faces the radially outer side in the present embodiment.

Further, the second groove 162 further includes a bottom surface 1623 facing the first axial side Da1. The bottom surface 1623 is arranged between the outer wall surface 1621 and the inner wall surface 1622 and extends at least in the radial direction as viewed in the axial direction.

In the present embodiment, the outer wall surface 1621, the inner wall surface 1622, and the bottom surface 1623 further extend in the circumferential direction, and extend toward the second circumferential side Dr2 as proceeding radially inward. An end of the outer wall surface 1621 on the radially inner side and on the second circumferential side Dr2 is connected to a radially outer end of the second rotor hole 152. An end of the inner wall surface 1622 on the radially inner side and on the second circumferential side Dr2 is connected to a radially inner end of the second rotor hole 152. An end of the bottom surface 1623 on the radially inner side and on the second circumferential side Dr2 is connected to an end of the second rotor hole 152 on the first circumferential side Dr1.

Preferably, the bottom surface 1623 extends toward the second axial side Da2 as proceeding from an end on the first circumferential side Dr1 toward the second rotor hole 152. More preferably, an end of the bottom surface 1623 on the second circumferential side Dr2 and on the radially inner side is connected to an end of the second rotor hole 152 on the second axial side Da2. Thus, air flowing in from the second rotor hole 152 can smoothly flow along the bottom surface 1623. Alternatively, air flowing in the vicinity of the bottom surface 1623 smoothly flows along the bottom surface 1623 toward the second rotor hole 152 and can flow out through the second rotor hole 152. Therefore, it is possible to suppress the occurrence of turbulence in the second rotor hole 152 and the second groove 162.

In the present embodiment, the rotor 1 includes both the first groove 161 and the second groove 162. However, the present invention is not limited to this example, and the rotor 1 may include only one of the first groove 161 and the second groove 162. Further, a pair of first ribs each having the first wall surface 1610 may be formed in the rotor 1 instead of at least part of the first grooves 161. At this time, the pair of first ribs is spirally or radially arranged similarly to the first grooves 161 as viewed from the axial direction, and protrudes to the second axial side Da2 from the end surface of the first plate portion 131 on the second axial side Da2. Further, a pair of second ribs each having the second wall surface 1620 may be formed instead of at least part of the second grooves 162. At this time, the pair of second ribs is spirally or radially arranged similarly to the second groove 162, and protrudes to the first axial side Da1 from the end surface of the second plate portion 132 on the first axial side Da1.

That is, it is sufficient for the rotor 1 to have at least one wall surface 160 of the first wall surface 1610 and the second wall surface 1620. In other words, at least one plate portion 13 of the first plate portion 131 and the second plate portion 132 may have the wall surface 160 facing the circumferential direction. Note that the "wall surface 160" is a generic term for the first wall surface 1610 and the second wall surface 1620. The wall surface 160 is arranged at an end of the above-described at least one plate portion 13 closer to the stator 2 in the axial direction, extends at least in the radial direction, and is connected to at least one of the rotor holes 150. Thus, air between the plate portion 13 and the stator 2 can be made to flow along the wall surface 160. Therefore, air flowing in from the rotor hole 150 that functions as the intake port can be made to smoothly flow along the wall surface 160, and thus, the occurrence of turbulence between the plate portion 13 and the stator 2 can be suppressed or prevented. Alternatively, the air flowing along the wall surface 160 can be smoothly discharged from the rotor hole 150 that functions as the exhaust port.

More preferably, the rotor 1 has both the first wall surface 1610 and the second wall surface 1620. In other words, the above-described wall surface 160 includes the first wall surface 1610 and the second wall surface 1620. Since the wall surface 160 includes both the first wall surface 1610 and the second wall surface 1620, the air can be made to smoothly flow in from the outside of the rotor 1 on one of the first wall surface 1610 and the second wall surface 1620, and the air can be made to smoothly flow out to the outside of the rotor 1 on the other. Therefore, the motor 100 can suppress or prevent the occurrence of turbulence between each of the first plate portion 131 and the second plate portion 132 and the stator 2 regardless of the rotational direction of the rotor 1, and can smoothly discharge the air flowing along the wall surface 160 from the rotor hole 150 that functions as the exhaust port.

The above-described wall surface 160 is more inclined in the circumferential direction as proceeding radially outward. Thus, the wall surface 160 can have a shape expanding spirally with respect to the central axis CX as viewed from the axial direction. Therefore, the air along the wall surface 160 can be made to smoothly flow in the circumferential direction with respect to the rotor hole 150.

At least one of the plate portions 13 of the rotor 1 may have at least one bottom surface of the bottom surface 1613 and the bottom surface 1623. The bottom surface is arranged at an end, closer to the stator 2 in the axial direction, of the at least one plate portions 13, expands in the circumferential direction from the wall surface 160, and is connected to at least one of the rotor holes 150. The bottom surface is more inclined to a side opposite to the stator 2 in the axial direction as approaching the at least one rotor hole 150 in the radial direction. For example, the bottom surface 1613 connected to the first rotor hole 151 expands in the circumferential direction from the end of the first wall surface 1610 of the first plate portion 131 on the first axial side Da1, and is more inclined to the first axial side Da1 as approaching the first rotor hole 151 in the radial direction. Further, the bottom surface 1623 connected to the second rotor hole 152 expands in the circumferential direction from the end of the second wall surface 1620 of the second plate portion 132 on the second axial side Da2, and is more inclined to the second axial side Da2 as approaching the second rotor hole 152 in the radial direction. Thus, air between the above-described at least one plate portion 13 and the stator 2 can smoothly flow toward the above-described at least one rotor hole 150. Alternatively, air flowing in from the above-described at least one rotor hole 150 can smoothly flow between the above-described at least one plate portion 13 and the stator 2, and the occurrence of turbulence can be suppressed or prevented.

Next, the stator 2 will be described with reference to FIGS. 1 and 2. The stator 2 rotationally drives the rotor 1 in accordance with supply of electric power. The stator 2 includes the annular stator core 21 surrounding the central axis CX. As described above, the motor 100 includes the stator 2. The stator core 21 is a laminated body in which electromagnetic steel plates are laminated in the present embodiment.

The stator 2 further includes the coil portion 22 in which a conductive wire is arranged on the stator core 21. Specifically, the stator 2 further includes an insulator 23 having electrical insulation. The conductive wire of the coil portion 22 is wound around the stator core 21 with the insulators 23 interposed therebetween.

Next, the stator holder 3 will be described with reference to FIGS. 1 and 2. The stator holder 3 holds the stator 2. As described above, the motor 100 includes the stator holder 3. The stator holder 3 has a cylindrical shape surrounding the central axis CX and extending in the axial direction, and rotatably supports the shaft 10 via a bearing 30. The bearing 30 is a ball bearing in FIG. 1, but is not limited to this example and may be other types of bearings such as a sliding bearing.

The stator holder 3 includes a holder base 31 and a holder cylindrical portion 32. The holder base 31 and the holder cylindrical portion 32 surround the central axis CX and extend in the axial direction. The holder base 31 holds the stator core 21. A part of the stator core 21 on the second axial side Da1 is fixed to a radially outer end of the holder base 31. The holder cylindrical portion 32 is arranged on the radially inner side of the stator core 21 and extends from an end of the holder base 31 on the first axial side Da1 to the first axial side Da1. The holder cylindrical portion 32 faces the stator 2 in the radial direction with a gap. Since the gap is provided between the stator 2 and the holder cylindrical portion 32, an exposed area of the stator 2 can be further widened. Therefore, the heat dissipation efficiency of the stator 2 can be improved.

Next, the base portion 4 will be described with reference to FIGS. 1 to 2. The base portion 4 supports the stator holder 3. As described above, the motor 100 includes the base portion 4. The base portion 4 expands in a direction perpendicular to the axial direction and is connected to an end of the stator holder 3 on the second axial side Da2. Note that screwing is adopted as a connection means of the base portion 4 in FIG. 1. However, the connection means of the base portion 4 is not limited to this example, and other means, such as adhesion and welding, may be adopted.

The base portion 4 has a base portion recess 41. The base portion recess 41 is arranged on an end surface of the base portion 4 on first axial side Da1 and is recessed to the second axial side Da2. The base portion recess 41 is connected to a space inside the stator holder 3. An end of the shaft 10 on the second axial side Da2 is inserted into the base portion recess 41.

Further, the base portion 4 has a holder opening 42. The holder opening 42 penetrates the base portion 4 in the axial direction. The holder opening 42 is arranged on the radially outer side with respect to the base portion recess 41. The holder opening 42 axially faces a gap between the radially inner end of the second plate portion 132 and the radially outer end of the holder base 31 in the radial direction.

Figure 6:
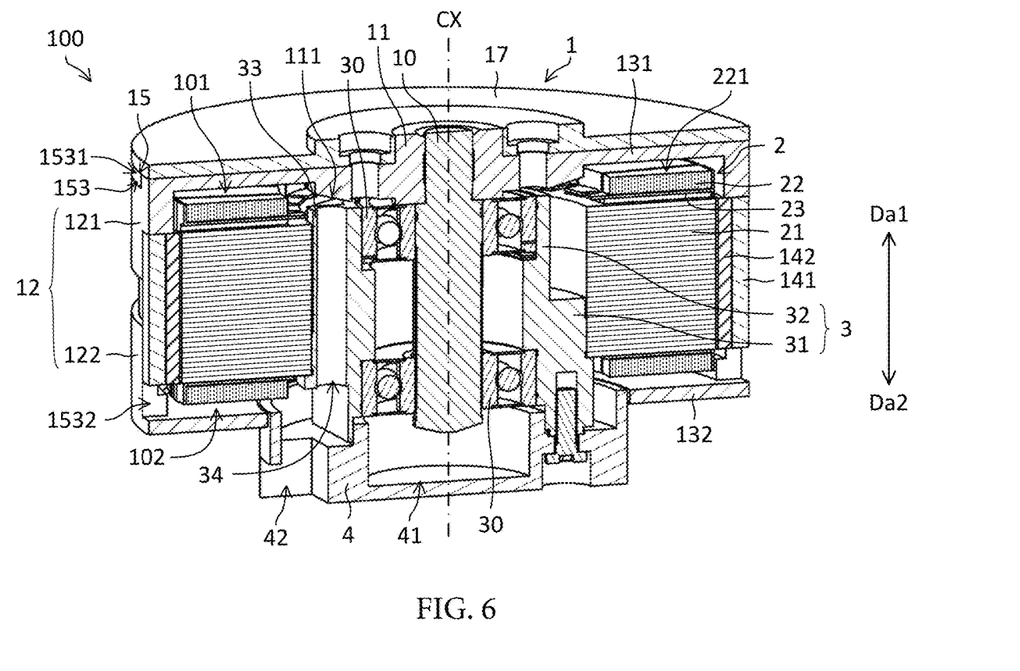
FIG. 6 is a sectional view illustrating a configuration example of a motor according to a modification of the first embodiment.
Figure 7:
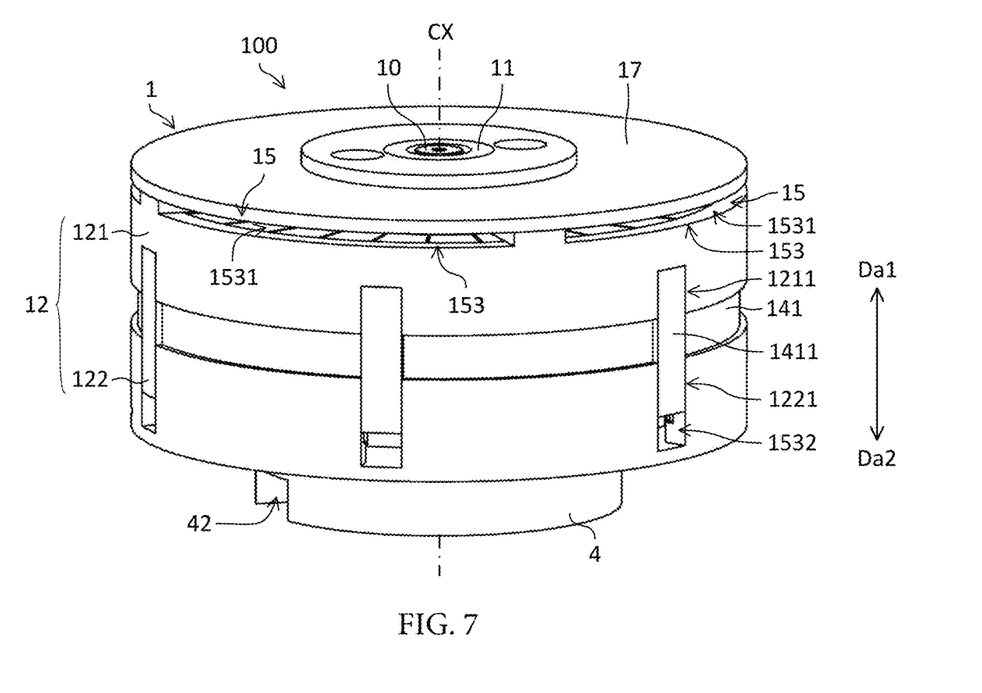
FIG. 7 is a perspective view illustrating an appearance of the motor according to the modification of the first embodiment.
Figure 8:
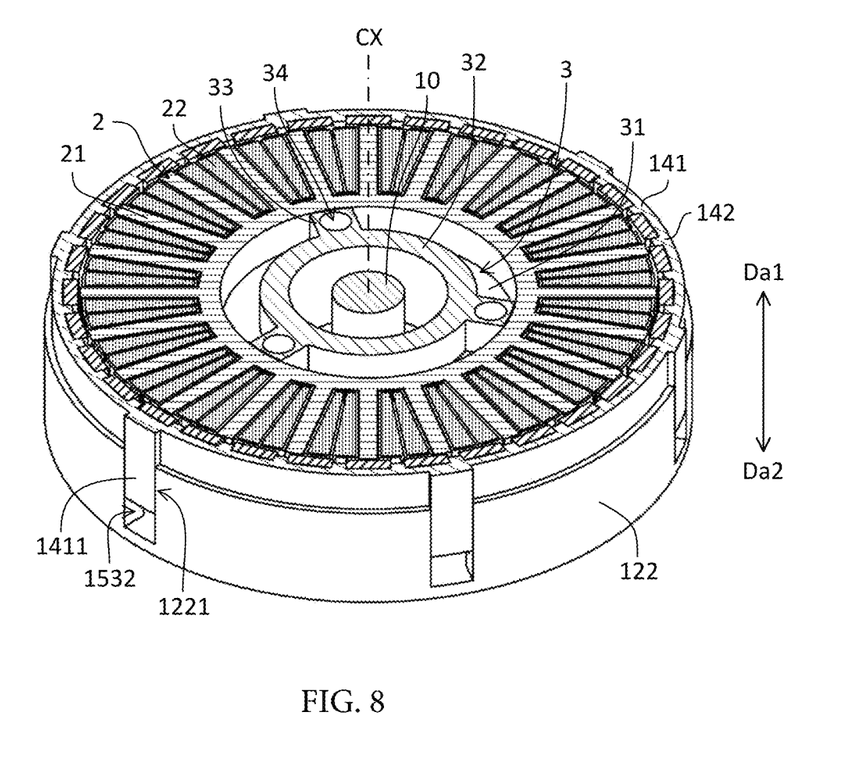
FIG. 8 is a sectional view illustrating a configuration example of a stator holder viewed from an axial direction.

Next, a modification of the first embodiment will be described with reference to FIGS. 6 to 8. FIG. 6 is a sectional view illustrating a configuration example of the motor 100 according to a modification of the first embodiment. FIG. 7 is a perspective view illustrating an appearance of the motor 100 according to the modification of the first embodiment. FIG. 8 is a sectional view illustrating a configuration example of the stator holder 3 viewed from the axial direction. Here, configurations different from those of the first embodiment will be described. Further, the same components as those in the above-described first embodiment are denoted by the same reference signs, and the description thereof may be omitted.

In the modification of the first embodiment, the rotor 1 further includes the side hole 153 penetrating the cylindrical portion 12 in the radial direction. That is, the hole 15 of the rotor 1 includes the side hole 153. Since the side hole 153 is arranged in the cylindrical portion 12, air dissipated from the stator 2 by the rotation of the rotor 1 can be discharged to the outside of the rotor 1. Therefore, the air between the rotor 1 and the stator 2 can be efficiently ventilated, and thus, the cooling efficiency of the stator 2 can be improved. Furthermore, it is possible to prevent water or dust from entering the inside of the rotor 1 through the side hole 153 due to air exhaust from the side hole 153.

In FIGS. 6 and 7, the rotor 1 does not include the first rotor hole 151, the second rotor hole 152, the first groove 161, and the second groove 162. However, the present invention is not limited to this example, and the rotor 1 may have at least part thereof.

The side hole 153 includes at least one of the first side hole 1531 and the second side hole 1532. For example, in FIGS. 6 and 7, the side hole 153 includes both the first side hole 1531 and the second side hole 1532. The first side hole 1531 penetrates the first cylindrical portion 121 in the radial direction and extends in the circumferential direction. The second side hole 1532 penetrates the second cylindrical portion 122 in the radial direction. In FIGS. 6 to 8, the second side hole 1532 is a part of the recess 1221 of the second cylindrical portion 122, and is an opening arranged between a bottom surface of the recess 1221 facing the first axial side Da1 and an end of the protrusion 1411 of the rotor core 141 on the second axial side Da2. In FIGS. 6 and 7, a plurality of the first side holes 1531 and a plurality of the second side holes 1532 are arranged side by side in the circumferential direction. However, the present invention is not limited to this example, and at least either the first side hole 1531 or the second side hole 1532 may be one.

Preferably, at least part of the first side holes 1531 is located on the first axial side Da1 with respect to the stator core 21. Further, at least part of the second side holes 1532 is located on the second axial side Da2 with respect to the stator core 21. More preferably, all of the first side holes 1531 are located on the first axial side Da1 with respect to the stator core 21. Further, all of the second side holes 1532 are located on the second axial side Da2 with respect to the stator core 21. Thus, the motor 100 can efficiently ventilate the first space 101 and/or the second space 102. For example, the motor 100 can discharge air between the first plate portion 131 and the stator 2 from the first side hole 1531 to the outside of the rotor 1 by the rotation of the rotor 1. Therefore, the motor 100 can improve the heat dissipation efficiency of a part (particularly, the coil head 221) of the stator 2 on the first axial side Da1. Further, the motor 100 can discharge the air between the second plate portion 132 and the stator 2 from the second side hole 1532 to the outside of the rotor 1 by the rotation of the rotor 1. Therefore, the motor 100 can improve the heat dissipation efficiency of the part (particularly, the coil head 221) of the stator 2 on the second axial side Da2.

The rotor 1 further includes an inclined surface 111 that is more inclined toward the first axial side Da1 as proceeding radially outward. The inclined surface 111 is arranged at an end of the rotor hub 11 on the second axial side Da2 and extends in the circumferential direction.

In addition, the rotor 1 further includes a rotor cover 17. The rotor cover 17 is arranged at an end of the first plate portion 131 on the first axial side Da1 and on the radially outer side, and expands radially outward from a radially outer end of the rotor hub 11.

Next, the stator holder 3 further includes ridge portions 33 and holder through-holes 34.

The ridge portion 33 extends from an end of the holder base 31 on the first axial side Da1 to the first axial side Da1, and protrudes radially outward from a radially outer end of the holder cylindrical portion 32. In FIG. 8, three ridge portions 33 are arranged side by side in the circumferential direction. However, the present invention is not limited to the example of FIG. 8, and the number of the ridge portions 33 may be one or a plural number other than three. A part of the stator core 21 on the first axial side Da1 is fixed to a radially outer end of the ridge portion 33.

The holder through-hole 34 is arranged on the radially inner side of the stator 2 and penetrates the stator holder 3 in the axial direction. As described above, the stator holder 3 has the holder through-hole 34. Specifically, the holder through-hole 34 penetrates the holder base 31 and the ridge portion 33 in the axial direction. Thus, the first space 101 on the first axial side Da1 with respect to the stator 2 can be connected to the second space 102 on the second axial side Da2 with respect to the stator 2 via the holder through-hole 34. As described above, the first space 101 is a space between the stator 2 and the first plate portion 131 in the axial direction. The second space 102 is a space between the stator 2 and the second plate portion 132 in the axial direction. The circulation of air between the rotor 1 and the stator 2 can be further activated by increasing a passage through which the air flows. Further, the passage of the air extending in the axial direction can be arranged on the radially inner side of the stator 2, and thus, a radially inner end of the stator 2 can dissipate heat. Therefore, the heat dissipation efficiency of the stator 2 can be improved.

An end of at least one holder through-hole 34 on the second axial side Da2 is arranged near the holder opening 42. Preferably, the end of the at least one holder through-hole 34 on the second axial side Da2 overlaps the holder opening 42 in the axial direction. However, this example does not exclude a configuration in which ends of all the holder through-holes 34 on the second axial side Da2 do not overlap the holder opening 42 in the axial direction.

Preferably, a minimum diameter size of the holder through-hole 34 is smaller than a minimum diameter size of the holder opening 42. The flow velocity of air in the holder through-hole 34 can be further increased by narrowing a flow path cross-sectional area of the holder through-hole 34. Therefore, the inside of the holder through-hole 34 can be ventilated more quickly, and thus, the heat dissipation efficiency of the radially inner end of the stator 2 can be improved. However, this example does not exclude a configuration in which the minimum diameter size of the holder through-hole 34 is equal to or larger than the minimum diameter size of the holder opening 42.

Further, the sum of opening areas of the ends of the holder through-holes 34 on the second axial side Da2 may be larger than a cross-sectional area of an outer diameter of the holder cylindrical portion 32 as viewed from the axial direction. Thus, the flow path cross-sectional area of the holder through-hole 34 can be further increased, and thus, the movement of air in the motor 100 can be further activated, and the heat dissipation efficiency of the stator 2 can be further improved. However, this example does not exclude a configuration in which the above-described sum is equal to or smaller than the cross-sectional area of the outer diameter of the holder cylindrical portion 32 as viewed from the axial direction.

Preferably, an end of the holder through-hole 34 on the first axial side Da1 is located on the first axial side Da1 of an end of the stator core 21 on the first axial side Da1. Thus, the end of the holder through-hole 34 on the first axial side Da1 can be brought closer to the first space 101 between the first plate portion 131 and the stator 2. Therefore, air flowing through the holder through-hole 34 can efficiently flow into the first space 101. However, this example does not exclude a configuration in which the end of the holder through-hole 34 on the first axial side Da1 is not located on the first axial side Da1 of the end of the stator core 21 on the first axial side Da1.

Preferably, the end of the holder through-hole 34 on the first axial side Da1 faces the inclined surface 111 in the axial direction. More preferably, all of the ends of the holder through-holes 34 on the first axial side Da1 overlap the inclined surface 111 in the axial direction. Thus, air flowing out in the axial direction from the holder through-holes 34 flows along the inclined surface 111 to be smoothly delivered to the first space 101 between the first plate portion 131 and the stator 2. Since the air easily flows from the ends of the holder through-holes 34 on the first axial side Da1 toward the first space 101, the heat dissipation efficiency of the stator 2 can be improved. However, this example does not exclude a configuration in which the end of the holder through-hole 34 on the first axial side Da1 does not face the inclined surface 111 in the axial direction, and does not exclude a configuration in which the rotor 1 does not have the inclined surface 111, for example.

Preferably, the end of the holder through-hole 34 on the second axial side Da2 is located on the second axial side Da2 of the end of the stator core 21 on the second axial side Da2. Thus, air flowing into the second axial side Da2 of the stator core 21 easily flows into the holder through-hole 34. However, this example does not exclude a configuration in which the end of the holder through-hole 34 on the second axial side Da2 is not located on the second axial side Da2 of the end of the stator core 21 on the second axial side Da2.

Figure 9:
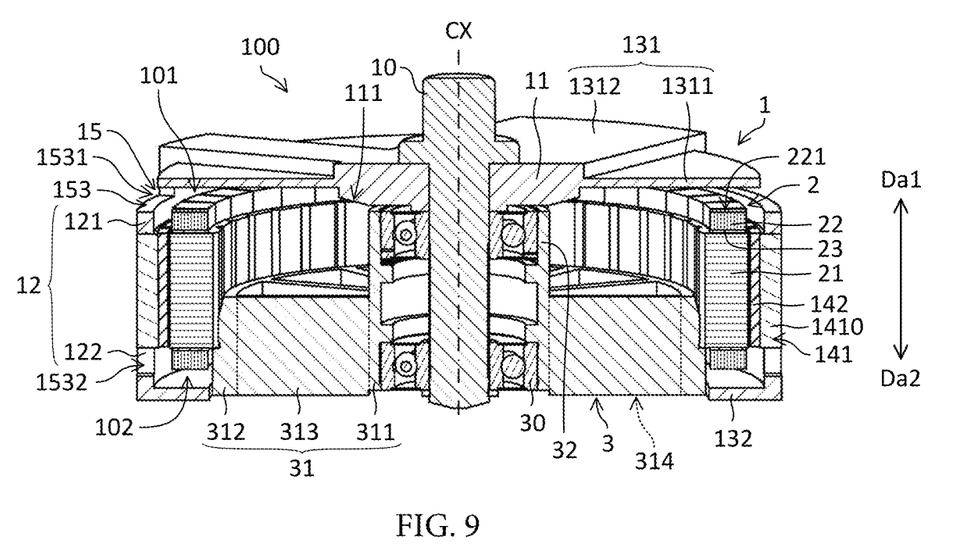
FIG. 9 is a sectional view illustrating a configuration example of a motor according to a second embodiment.
Figure 10:
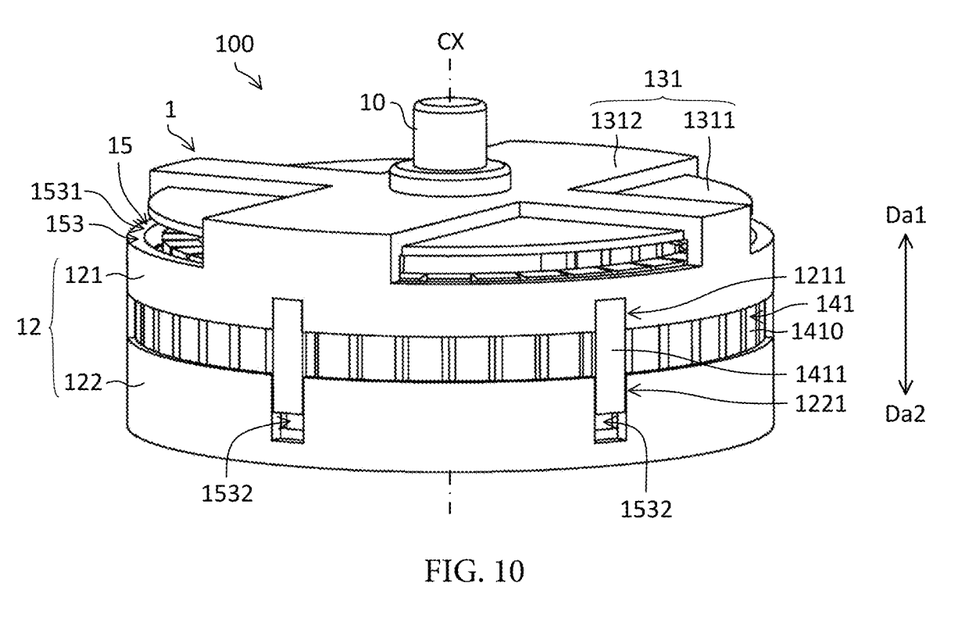
FIG. 10 is a perspective view illustrating an appearance of the motor according to the second embodiment.
Figure 11:
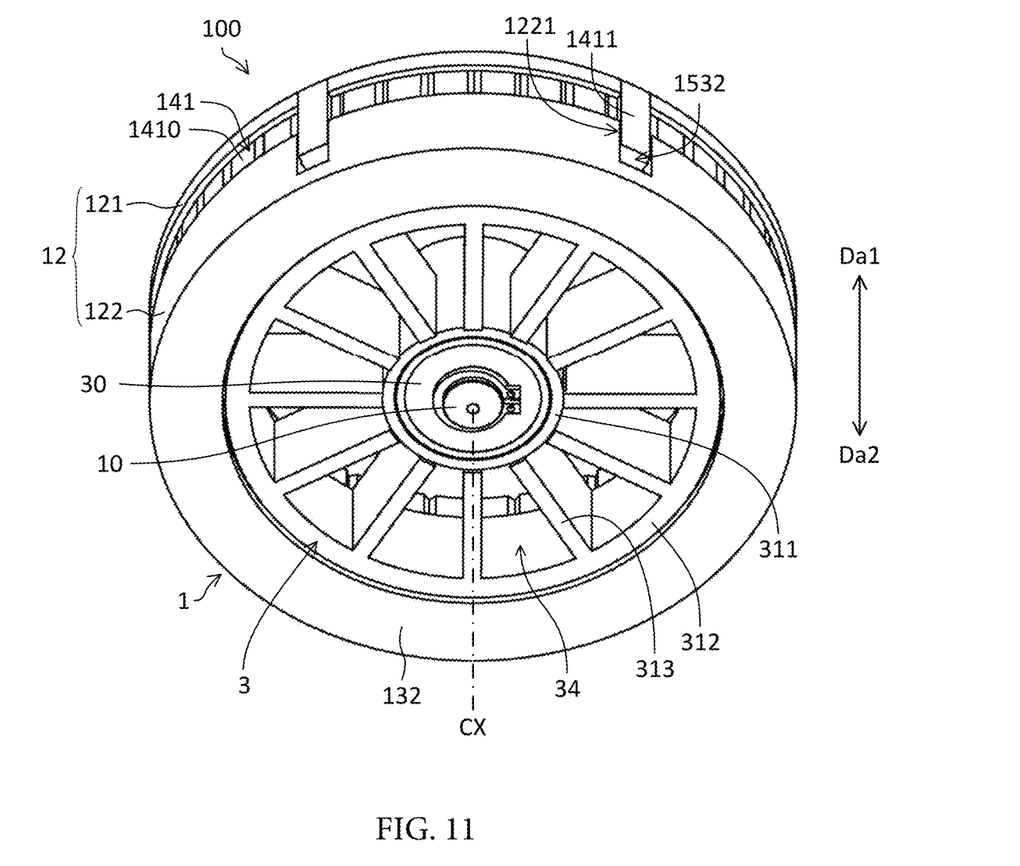
FIG. 11 is a perspective view illustrating an end on the second axial side of the motor according to the second embodiment.
Figure 12:
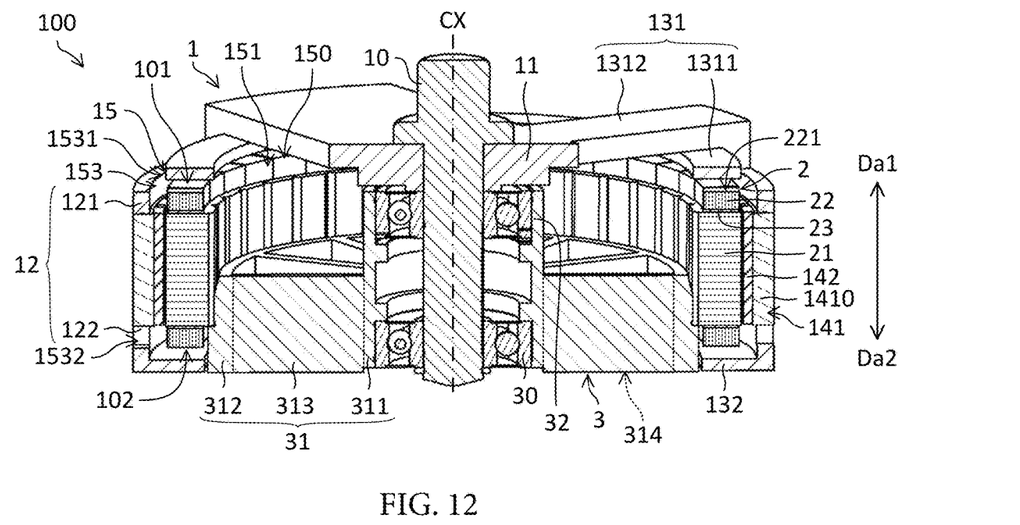
FIG. 12 is a sectional view illustrating a configuration example of a motor according to a modification of the second embodiment.
Figure 13:
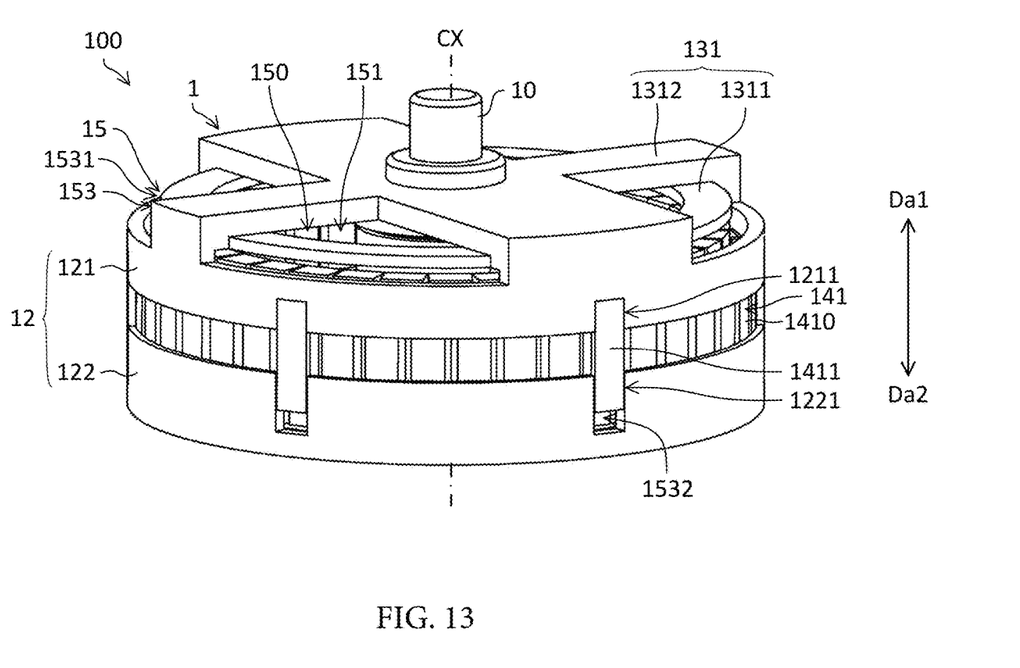
FIG. 13 is a perspective view illustrating an appearance of the motor according to the modification of the second embodiment.

Next, a second embodiment will be described with reference to FIGS. 9 to 13. FIG. 9 is a sectional view illustrating a configuration example of the motor 100 according to the second embodiment. FIG. 10 is a perspective view illustrating an appearance of the motor 100 according to the second embodiment. FIG. 11 is a perspective view illustrating an end on the second axial side Da2 of the motor 100 according to the second embodiment. FIG. 12 is a sectional view illustrating a configuration example of the motor 100 according to a modification of the second embodiment. FIG. 13 is a perspective view illustrating an appearance of the motor 100 according to the modification of the second embodiment. Note that configurations of the second embodiment and the modification of the second embodiment different from those of the first embodiment and the modification of the first embodiment described above will be described. Moreover, components similar to those in the first embodiment and the modification of the first embodiment described above are denoted by the same reference signs, and the description thereof may be omitted.

As illustrated in FIGS. 9 to 13, the motor 100 according to the second embodiment includes the rotor 1, the stator 2, and the stator holder 3.

The first plate portion 131 of the rotor 1 includes a disk portion 1311 and rotor ribs 1312. The disk portion 1311 is arranged on the first axial side Da1 with respect to the stator 2 and expands radially outward from the rotor hub 11. The first plate portion 131 has a radially outer end connected to the first cylindrical portion 121. The rotor ribs 1312 radially extend radially outward from a radially outer end of the rotor hub 11. The rotor rib 1312 has a radially outer end connected to the first cylindrical portion 121. An end surface of the rotor rib 1312 on the first axial side Da1 is located on the first axial side Da1 with respect to an end surface of the disk portion 1311 on the first axial side Da1.

The rotor core 141 of the rotor 1 has a plurality of core pieces 1410. The core piece 1410 is a magnetic body and is a laminated body of electromagnetic steel plates laminated in the axial direction. Each of the core pieces 1410 is arranged on a radially inner surface of the cylindrical portion 12 and expands in the axial direction and the circumferential direction. The plurality of core pieces 1410 are arranged side by side in the circumferential direction and surround the central axis CX.

The holes 15 of the rotor 1 include the side holes 153. The side holes 153 include the first side hole 1531 and the second side hole 1532. The first side hole 1531 is a recess that is recessed from an end of the first cylindrical portion 121 on the first axial side Da1 toward the second axial side Da1, penetrates the first cylindrical portion 121 in the radial direction, and extends in the circumferential direction. The second side hole 1532 penetrates the second cylindrical portion 122 in the radial direction. The configuration of the second side hole 1532 in the second embodiment is similar to that of the second side hole 1532 (see FIGS. 6 to 8) in the modification of the first embodiment. In FIGS. 9 to 11, a plurality of the first side holes 1531 and a plurality of the second side holes 1532 are arranged side by side in the circumferential direction. However, the present invention is not limited to this example, and at least one of the first side hole 1531 or the second side hole 1532 may be single.

In FIGS. 9 to 11, the rotor 1 does not include the first rotor hole 151 and the second rotor hole 152 (see FIG. 1) and the first groove 161 and the second groove 162 (see FIGS. 4A and 4B). However, the present invention is not limited to the examples of FIGS. 9 to 11, and the rotor 1 may have at least part thereof. For example, as illustrated in FIGS. 12 and 13, the rotor 1 may have the first rotor hole 151 penetrating the disk portion 1311 in the axial direction.

The stator holder 3 includes the holder base 31, the holder cylindrical portion 32, and the holder through-holes 34. The holder base 31 and the holder cylindrical portion 32 have a cylindrical shape extending in the axial direction and surround the central axis CX. The holder base 31 holds the stator core 21. A part of the stator core 21 on the second axial side Da2 is fixed to a radially outer end of the holder base 31. Further, on the second axial side Da2 of the stator 2, a radially outer end of the holder base 31 faces a radially inner end of the second plate portion 132 in the radial direction with a gap. That is, the radially inner end of the second plate portion 132 faces the stator holder 3 in the radial direction with the gap. The holder cylindrical portion 32 is arranged on the radially inner side of the stator core 21. The holder cylindrical portion 32 extends from an end of the holder base 31 on the first axial side Da1 to the first axial side Da1. A part of the holder cylindrical portion 32 on the first axial side Da1 with respect to the holder base 31 face the stator 2 in the radial direction with a gap. The holder through-hole 34 is arranged on the radially inner side of the stator 2 and penetrates the stator holder 3 in the axial direction.

The holder base 31 includes an inner cylindrical portion 311, an outer cylindrical portion 312, and a plurality of connecting portions 313. The inner cylindrical portion 311 and the outer cylindrical portion 312 have a cylindrical shape surrounding the central axis CX and extending in the axial direction, and are arranged concentrically on the second axial side Da2 of the holder cylindrical portion 32. The inner cylindrical portion 311 has an end on the first axial side Da1 connected to the holder cylindrical portion 32. The outer cylindrical portion 312 is arranged on the radially outer side of the inner cylindrical portion 311. The part of the stator core 21 on the second axial side Da2 is fixed to a radially outer surface of the outer cylindrical portion 312. The plurality of connecting portions 313 are arranged between the inner cylindrical portion 311 and the outer cylindrical portion 312 and arranged side by side in the circumferential direction. The connecting portion 313 extends radially outward from the inner cylindrical portion 311. The connecting portion 313 has a radially outer end connected to the outer cylindrical portion 312.

In the present embodiment, the holder through-hole 34 is an opening surrounded by the inner cylindrical portion 311, the outer cylindrical portion 312, and the connecting portions 313 adjacent in the circumferential direction, and penetrates the holder base 31 in the axial direction. Preferably, as illustrated in FIG. 11, the sum of opening areas of ends of the holder through-hole 34 on the second axial side Da2 is larger than a cross-sectional area of an outer diameter of the holder cylindrical portion 32 as viewed from the axial direction. Thus, a flow path cross-sectional area of the holder through-hole 34 at the end on the second axial side Da2 can be further increased, and thus, the circulation of air in the motor 100 can be further activated, and the heat dissipation efficiency of the stator 2 can be further improved. However, this example does not exclude a configuration in which the above-described sum is equal to or smaller than the cross-sectional area of the outer diameter of the holder cylindrical portion 32 as viewed from the axial direction.

The embodiments of the present invention have been described above. Note that the scope of the present invention is not limited to the above-described embodiments. The present invention is implemented by adding various modifications to the above-described embodiments within a range not departing from the spirit of the invention. Further, the matters described in the above-described embodiments are arbitrarily combined together as appropriate within a range where no inconsistency occurs.

The present invention is advantageous for, for example, a device in which a stator generates heat as a rotor rotates.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
    a rotor rotatable about a central axis extending in an axial direction; and
    a stator that includes a stator core having an annular shape surrounding the central axis,
    wherein the rotor includes:
    a cylindrical portion that is arranged on a radially outer side with respect to the stator and extends in the axial direction;
    a first plate portion that is arranged on a first axial side with respect to the stator and expands radially inward from a first axial end of the cylindrical portion;
    a second plate portion that is arranged on a second axial side with respect to the stator and expands radially inward from a second axial end of the cylindrical portion; and a hole penetrating at least one of the cylindrical portion, the first plate portion, and the second plate portion, wherein the hole includes at least one rotor hole of a first rotor hole penetrating the first plate portion in the axial direction and a second rotor hole penetrating the second plate portion in the axial direction, at least one plate portion of the first plate portion and the second plate portion has a wall surface facing a circumferential direction, and the wall surface is arranged at an end, closer to the stator in the axial direction, of the at least one plate portion, extends at least in the radial direction, and is connected to the at least one rotor hole, the at least one plate portion has a bottom surface facing the axial direction, and the bottom surface is arranged at an end, closer to the stator in the axial direction, of the at least one plate portion, extends in the circumferential direction from the wall surface, is connected to the at least one rotor hole, and is more inclined to a side opposite to the stator in the axial direction as approaching the at least one rotor hole in the radial direction.

2. The motor according to claim 1, wherein the stator further includes a coil portion in which a conductive wire is arranged on the stator core, and the at least one rotor hole overlaps the coil portion as viewed from the axial direction.

3. The motor according to claim 1, wherein the at least one rotor hole is arranged on a radially inner side with respect to the cylindrical portion, and the hole further includes a side hole penetrating the cylindrical portion in a radial direction.

4. The motor according to claim 3, wherein at least a part of the side hole is arranged closer to the at least one rotor hole than the stator in the axial direction.

5. The motor according to claim 1, wherein the wall surface is more inclined in the circumferential direction as proceeding radially outward.

6. The motor according to claim 1, further comprising a stator holder holding the stator, wherein the stator holder includes at least one holder through-hole that is arranged on the radially inner side with respect to the stator and penetrates the stator holder in the axial direction.

7. The motor according to claim 6, wherein the stator holder further includes:

a holder base that holds the stator core; and a holder cylindrical portion extending from the holder base to the first axial side, and a sum of an opening area at a second axial end for each of the at least one holder through-hole is greater than a cross-sectional area of an outer diameter of the holder cylindrical portion as viewed from the axial direction.

8. An aircraft comprising the motor according to claim 1.

9. A motor comprising:

a rotor rotatable about a central axis extending in an axial direction; and a stator that includes a stator core having an annular shape surrounding the central axis, wherein the rotor includes:

a cylindrical portion that is arranged on a radially outer side with respect to the stator and extends in the axial direction;

a first plate portion that is arranged on a first axial side with respect to the stator and expands radially inward from a first axial end of the cylindrical portion;

a second plate portion that is arranged on a second axial side with respect to the stator and expands radially inward from a second axial end of the cylindrical portion; and a hole penetrating at least one of the cylindrical portion, the first plate portion, and the second plate portion, wherein the hole includes at least one rotor hole of a first rotor hole penetrating the first plate portion in the axial direction and a second rotor hole penetrating the second plate portion in the axial direction, at least one plate portion of the first plate portion and the second plate portion has a wall surface facing a circumferential direction, and the wall surface is arranged at an end, closer to the stator in the axial direction, of the at least one plate portion, extends at least in the radial direction, and is connected to the at least one rotor hole, wherein the hole includes the first rotor hole and the second rotor hole, and the wall surface includes:

a first wall surface that is arranged at a second axial end of the first plate portion, extends at least in the radial direction, is connected to the first rotor hole, and is more inclined to a first circumferential side as proceeding radially inward; and a second wall surface that is arranged at a first axial end of the second plate portion, extends at least in the radial direction, is connected to the second rotor hole, and is more inclined to a second circumferential side as proceeding radially inward.

\* \* \* \* \*